United States Patent
Wu et al.

(10) Patent No.: US 7,110,455 B2
(45) Date of Patent: Sep. 19, 2006

(54) NOISE REDUCTION PRE-PROCESSOR FOR DIGITAL VIDEO USING PREVIOUSLY GENERATED MOTION VECTORS AND ADAPTIVE SPATIAL FILTERING

(75) Inventors: Siu-Wai Wu, San Diego, CA (US); Jing Yang Chen, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 160 days.

(21) Appl. No.: 09/929,553

(22) Filed: Aug. 14, 2001

(65) Prior Publication Data

US 2003/0039310 A1 Feb. 27, 2003

(51) Int. Cl.
*H04N 7/12* (2006.01)

(52) U.S. Cl. .................. 375/240.16; 382/272; 348/699
(58) Field of Classification Search ............ 375/240.16, 375/240.12, 240.18, 240.29, 240.01; 348/699, 348/701; 382/272, 264, 253; 370/290
See application file for complete search history.

(56) References Cited

U.S. PATENT DOCUMENTS

| | | | | |
|---|---|---|---|---|
| 4,942,466 A | * | 7/1990 | Sandbank et al. ...... | 375/240.01 |
| 5,367,629 A | * | 11/1994 | Chu et al. .................. | 382/253 |
| 5,502,510 A | * | 3/1996 | Kim et al. .................. | 348/701 |
| 6,005,626 A | * | 12/1999 | Ding ...................... | 375/240.16 |
| 6,178,205 B1 | * | 1/2001 | Cheung et al. ......... | 375/240.29 |
| 6,310,915 B1 | * | 10/2001 | Wells et al. ............ | 375/240.03 |

* cited by examiner

*Primary Examiner*—Gims Philippe
(74) *Attorney, Agent, or Firm*—Robert P. Marley

(57) ABSTRACT

Noise is reduced in a video system by applying motion compensated temporal filtering using previously generated motion vectors and adaptive spatial filtering at scene change frames. Various types of noise can be introduced into video prior to compression and transmission. Artifacts arise from recording and signal manipulation, terrestrial or orbital communications, or during decoding. Noise introduced prior to image compression interferes with performance and subsequently impairs system performance. While filtering generally reduces noise in a video image, it can also reduce edge definition leading to loss of focus. Filtering can also tax system throughput, since increased computational complexity often results from filtering schemes. Furthermore, the movement of objects within frames, as defined by groups of pixels, complicates the noise reduction process by adding additional complexity. In addition to improvements made to FIR spatial filtering, the present invention improves on previous filtering techniques by using Infinite Impulse Response (IR) temporal filtering to reduce noise while maintaining edge definition. It also uses motion vectors previously calculated as part of the first-pass image encoding or alternatively by transcoding to reduce computational complexity for P-frame and B-frame image preprocessing. Single stage P-frame temporal noise filtering and double stage B-frame temporal noise filtering are presented.

10 Claims, 4 Drawing Sheets

NOISE REDUCTION PRE-PROCESSOR FOR DIGITAL VIDEO USING PREVIOUSLY GENERATED MOTION VECTORS AND ADAPTIVE SPATIAL FILTERING

BACKGROUND OF THE INVENTION

The present invention relates to an apparatus and method for reducing noise in a video system by applying motion compensated temporal filtering using previously generated motion vectors and adaptive spatial filtering at scene change frames.

Digital television offers viewers high quality video entertainment with features such as pay-per-view, electronic program guides, video-on-demand, weather and stock information, as well as Internet access. The video images, packaged in an information stream, are transmitted to the user via a broadband communication network over a satellite, cable, or terrestrial transmission medium. Due to bandwidth and power limitations, efficient transmission of film and video demands that compression and formatting techniques be extensively used. Protocols such as MPEG1 and MPEG2 maximize bandwidth utilization for film and video information transmission by adding a temporal component to a spatial compression algorithm.

Each individual image in a sequence of images on film or video is referred to as a frame. Each frame is made up of a large number of picture elements (pixels) that define the image. Within each frame, redundant pixels describe like parts of a scene, e.g. a blue sky. Various types of compression algorithms have been used to remove redundant spatial elements thereby decreasing the bandwidth requirements for image transmission. Sequences of frames on film or video often contain pixels that are very similar or identical as well. In order to maximize bandwidth utilization, compression and motion compensation protocols, such as MPEG, are typically used to minimize these redundant pixels between adjacent frames. Frames referenced by an encoder for the purpose of predicting motion of images within adjacent frames are called anchor frames. These anchor frames can be of type Intra-frame (I-frame) or Predicted-frame (P-frame). Groups of pixels (macroblocks) that are mapped without reference to other frames make up I-frames, while P-frames contain references to previously encoded frames within a sequence of frames. A third type of frame referred to as a Bi-directional (B-frame) contains macroblocks referred from previously encountered anchor frames and macroblocks from anchor frames that follow the frame being currently analyzed. Both B-frame and P-frame encoding reduce duplication of pixels by calculating motion vectors associated with macroblocks in a reference frame, resulting in reduced bandwidth requirements. The choice of encoding type for a particular frame is dependent upon the complexity of that image.

For images that pan, pixels that describe moving objects are largely the same, in that they are only spatially displaced. Instead of repeatedly specifying these pixels in consecutive frames, it is often advantageous to reference groups of them, i.e. macroblocks, in previous (or forthcoming) frames. A motion vector directs the video processor where to obtain the macroblock in a referenced frame. The use of motion vectors for this purpose is referred to as motion compensation. Motion compensation can also be exploited to help reduce the effect of noise in encoded video images.

Various types of noise can be introduced into video prior to compression and transmission. Artifacts from the imaging and recording equipment, from terrestrial or orbital transmission equipment, from communication channels, and from encoding and decoding equipment are well known. Noise introduced prior to image compression is problematic because it interferes with the performance of subsequent compression systems by monopolizing data bandwidth while decreasing video quality. Additionally, quantizing in the Discrete Cosine Transform (DCT) domain tends to magnify the effects of noise leading to increased signal degradation.

While filtering reduces noise in a video image, it can, consequently, reduce the resolution (e.g. sharpness) of the image, leading to imprecise edge transitions, thereby reducing apparent focus. An edge is defined as an abrupt change in pixel amplitude such as a color difference and/or luminance amplitude change between sets of pixels. These abrupt changes are typically oriented in a vertical or horizontal direction, such as an edge between a blue sky and a black building.

Accordingly, there is a need for an improved noise filtering system that would reduce many of the disadvantageous effects found with contemporary digital image filters. The present invention provides a solution for solving these problems while simultaneously providing enhanced throughput of film or video frame encoding.

SUMMARY OF THE INVENTION

The present invention relates to an apparatus and method for reducing noise in a video system by applying a motion compensated temporal filtering algorithm using previously generated motion vectors, and adaptive spatial filtering at scene change frames.

In a two-pass video compression and encoding system, a motion compensated temporal and adaptive spatial filtering sub-system for pre-compressed video image data is described. By using a storage element that provides a frame buffer for storing at least three consecutive video frames, a noise reduction scheme can be implemented for input video frames. The buffered frames include a current frame, a first anchor frame that precedes the frame currently being encoded, and a second anchor frame that follows the current frame. The images on each of these frames are represented by a plurality of pixels, where each pixel exhibits a signal amplitude. Many of the images on the current frame are repeated on the first (preceding) and second (following) frames in the Group of Pictures (GOP). If the current frame is not determined to be a scene change frame, then the frame is processed using P-frame or B-frame encoding. For P-frame encoding, a forward prediction stage is implemented, whereby an absolute value of the difference between the amplitude of a pixel in the current frame and the amplitude of a pixel in the first frame is determined. This value is used to evaluate a non-linear filter coefficient, β(forward), for an Infinite Impulse Response (IIR) filter using a lookup table implementation. As a result of the panning of objects within the images, the first frame pixel location is offset from the current frame pixel location as described by a previously calculated motion vector. Using these motion vectors, a proportional value for the amplitude of the previous anchor frame pixel is determined, and is multiplied by the filter coefficient β(forward). The result is added to the proportional value of the selected pixel amplitude in the current frame, multiplied by (1-β(forward)). Applying an arithmetic manipulation of their respective amplitude values along with the numerical values of β(forward), (1-(β(forward)), and the motion vectors associated with the previous anchor frame, a current frame pixel amplitude is calculated.

For B-frame encoding, the temporal filtering process is divided into two stages. The first stage, forward prediction, behaves identically to the P-frame encoding scheme described above. The pixel data for the current frame, as filtered by the forward prediction process of the first stage, is thereafter sent to a second stage where the backward prediction process filters the frame once again. An absolute value difference between the amplitude of a pixel located in a current frame and the amplitude of a pixel located in a second (following) frame is calculated. The second frame pixel location is offset from the current frame pixel location by a previously calculated motion vector. A non-linear IIR filter coefficient, $\beta$(backward), is determined from a lookup table, with values between 0 and 1, corresponding to the calculated absolute value difference. The location of the pixel in the second frame is specified by a location in the current frame, but offset by an amount described by a previously calculated motion vector. The product of $\beta$(backward) and the motion compensated second frame pixel value yields a proportion of the second anchor frame pixel value that is represented within the current frame pixel value. The product of (1-$\beta$(backward)) and the current frame pixel value results in a proportion of the current anchor frame pixel value that should contribute to the final current frame pixel value. The sum of these two partial frame pixel values represents the current frame pixel value.

The results of these temporally filtered pixel amplitude values are further processed by spatial filtering and other system elements in a pipeline architecture. Delay elements are also introduced to provide a degree of look-ahead for providing statistical multiplexing rate control. The motion vectors herein described can be calculated by a first-pass encoder or alternatively using transcoding. This, in effect eliminates the need for regeneration of the motion vectors during subsequent filtering steps.

When a scene change frame is detected, the output from a non-linear adaptive spatial filter is selected in lieu of the motion compensated temporal filtered output. For adaptive spatial filtering, each output frame pixel value equals a weighted mean value that is a composite of neighboring pixels amplitude values. The weight of a neighboring pixel is determined by a predetermined reference table, and is inversely proportional to the distance of each pixel from the subject pixel. Each non-linear filter has associated with it, a filter coefficient that adapts to the absolute value difference between the input pixel amplitude and the weighted sum of the neighboring pixel amplitudes.

DETAILED DESCRIPTION OF THE INVENTION

The present invention relates to an apparatus and method for reducing the presence of noise in a video system by applying motion compensated temporal filtering using previously generated motion vectors, in addition to adaptive spatial filtering.

Figure 1:
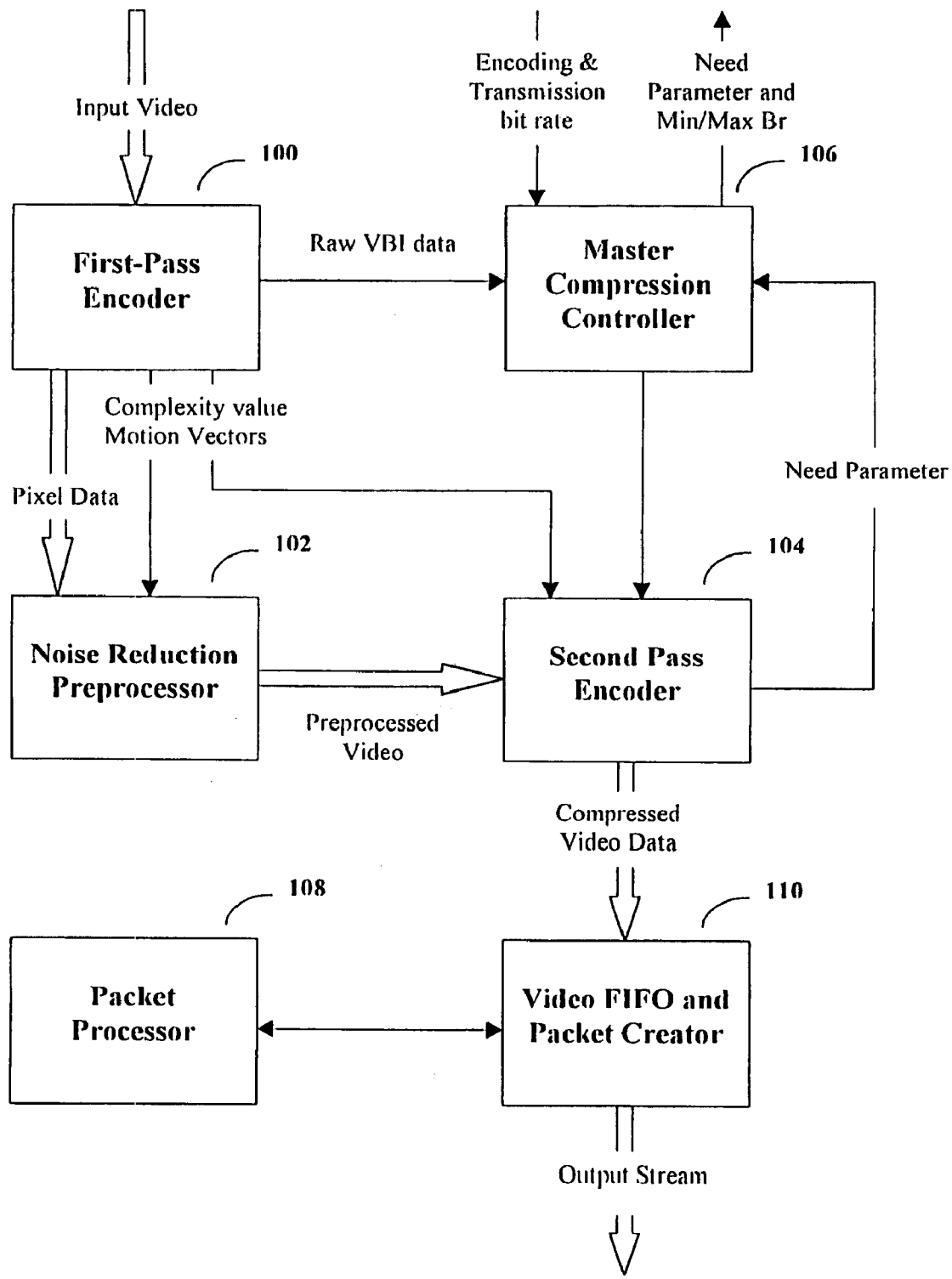
FIG. 1 illustrates an example system processing architecture block diagram in accordance with the present invention.

FIG. 1 illustrates a block diagram of an example processing architecture of the video frame encoding sub-system in accordance with the present invention. The sub-system is one part of a larger digital video encoding system.

The sub-system is composed of the following elements:

a first-pass encoder 100;

a noise reduction preprocessor 102;

a second pass encoder 104;

a master compression controller (MCC) 106;

a packet processor 108; and a video FIFO queue and packet creator 110.

System Overview

The first-pass encoder 100, noise reduction preprocessor 102 and second pass encoder 104 act in concert to estimate the complexity of incoming video frames, filter the incoming video for noise, and are responsible for compressing the incoming video images. The second pass encoder prepares need parameters, and provides this information to a rate control processor (not shown), which in turn provides a corresponding encoding bit rate allocation to the second pass encoder. In effect, the cascade of first and second pass encoders encodes a single channel of input data and performs data compression that includes motion compensation (for P- and B-frames), discrete cosine transform (DCT) and quantization. The encoders may provide feedback information to the rate control processor regarding the actual encoding bit rate. A master compression controller (MCC) 106 controls the compression of the data for the encoders via a peripheral component interconnect (PCI) bus. The encoded data is provided to a packet creator 110 that works in connection with a packet processor 108 to provide a multiplexed bitstream of video data. A video first-in, first-out (FIFO) buffer 110 temporarily stores the compressed data, and a packet processor 108 forms packets of the compressed data with appropriate header information, e.g., according to the MPEG-2 or other video standard. Thereafter, the data is sent to a transmitter for transmission of the output stream across a channel.

At a decoding side, a receiver, a buffer, and a demultiplexer are provided to output a decoded video signal, e.g., for display on a television.

Figure 2:
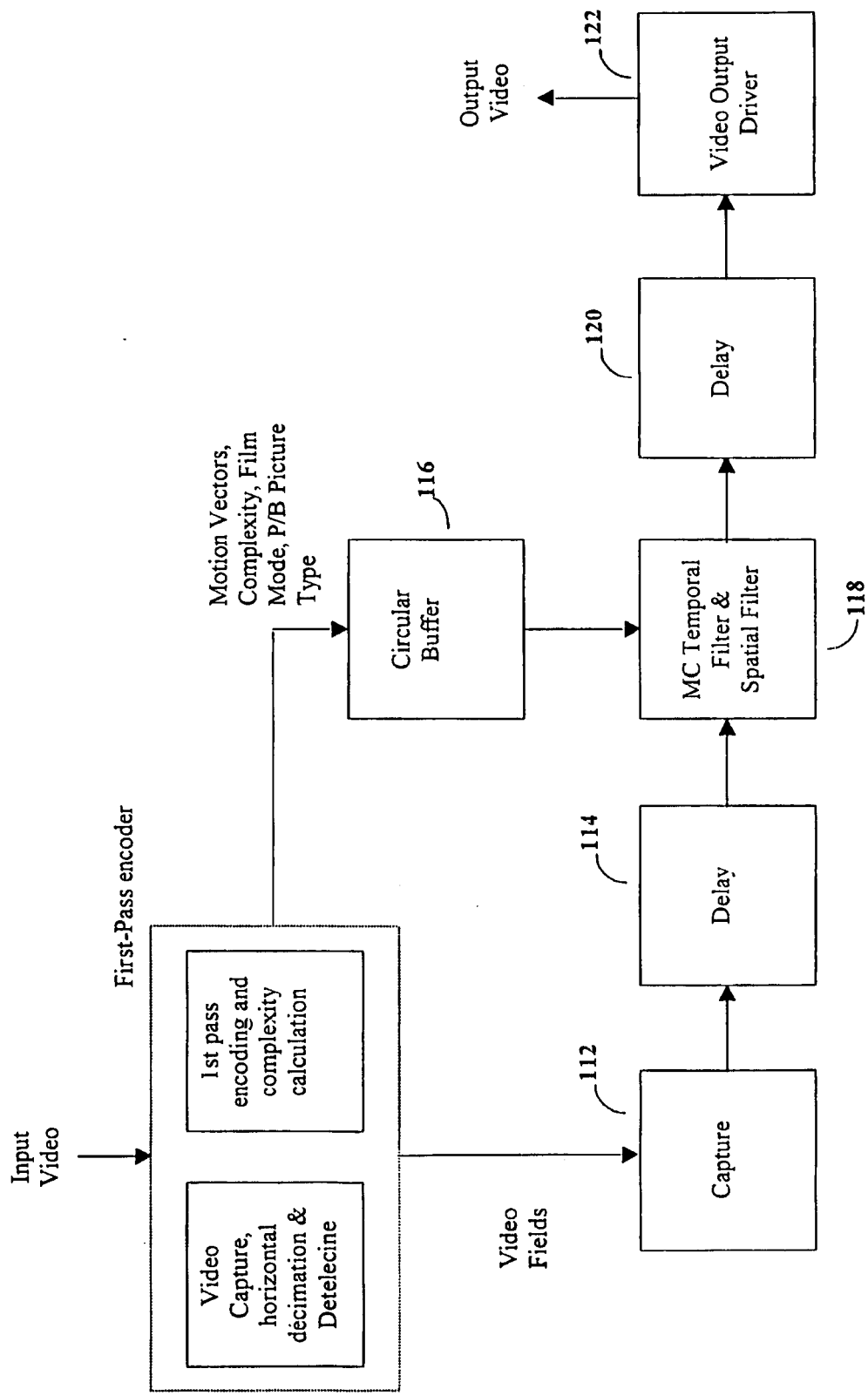
FIG. 2 illustrates the processing pipeline associated with the noise-reduction processor and the first pass encoder.

The noise reduction preprocessor 102 applies spatial and temporal filtering to incoming video frames to reduce the effects of video noise. The temporal filter uses motion vectors supplied by the first-pass encoder to accurately apply noise filtering to moving objects within a succession of video frames, while simultaneously reducing system resource usage. Alternatively, transcoding can be used to obtain the requisite motion vectors. Transcoding allows previously calculated motion vectors to be sent to the temporal filter within the bit-stream sent along the channel. A data flow diagram for a general noise-reduction preprocessing pipeline is shown in FIG. 2. As indicated, video capture, horizontal decimation and detelecine are performed on the video frames by the first-pass encoder 100 prior to noise reduction preprocessing. These frames are sent to the video capture module 112 of the noise reduction preprocessor and delayed by a conventional delay element 114. Type encoding, and motion vector synthesis are also performed by the first-pass encoder and sent to a circular buffer 116, then on to the temporal and spatial 118 filter modules within the noise reduction preprocessor. The noise reduction preprocessor, and the temporal filter in particular, uses this information to perform an adaptive infinite impulse response (IIR) filtering on successively received frames. Thereafter, filtered video frames are sent to a series of delay elements 120 and finally sent to a video output driver 122 to be transmitted to the second pass encoder 104 for further processing.

Noise Reduction

The noise reduction preprocessor performs adaptive spatial filtering and motion compensated temporal filtering to reduce the effects of video source noise before compression. It also delays the video to provide a look-ahead for statistical multiplexing rate control and for special event processing.

Adaptive Temporal Filtering

The motion compensated temporal filter is an IIR filter. The motion vectors generated by the first-pass encoding are used to trace motion of objects within frames.

For P frames, the filter generates the following output for every pixel pOut at coordinate (x,y):

$$pOut\ [x, y] = (1 - \beta_{fwd})^* pIn\ [x, y] + \beta_{fwd}^* prevPOut\ [x-MVx, y-MVy]$$

where:

pIn [x, y] is the input pixel at address [x,y] of the current P frame.

prevPOut [x, y] is the pixel value at address [x, y] of the previous output P frame;

[MVx, MVy] is the field motion vector, half pet value truncated. MVy is scaled to the frame coordinate according to the field select bit in the motion vector.

$\beta_{fwd}$ is a nonlinear function of the absolute difference between pIn[x, y] and prevPOut[x,y], implemented by a lookup table. (i.e., $\beta_{fwd}$=Look-up-table ($|pIn[x,y]-$ prevPOut $[x-MVx, y-MVy]|$).

Figure 3:
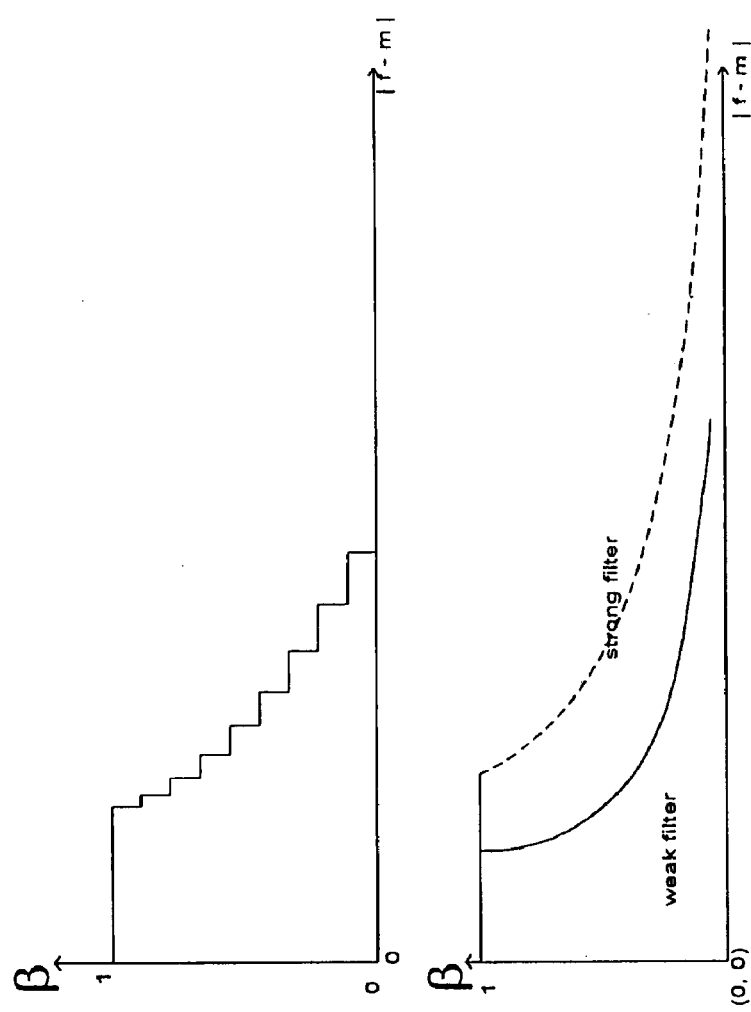
FIG. 3 illustrates an adaptation of the filter coefficient indicating multiple filter intensities.

An example of the adaptive characteristic of the temporal filter coefficient is shown in FIG. 3. Multiple lookup tables are used to describe this adaptive characteristic. For the pixels on the edges, the filter coefficient β tends toward zero, which implies that no filtering is applied.

Figure 4:
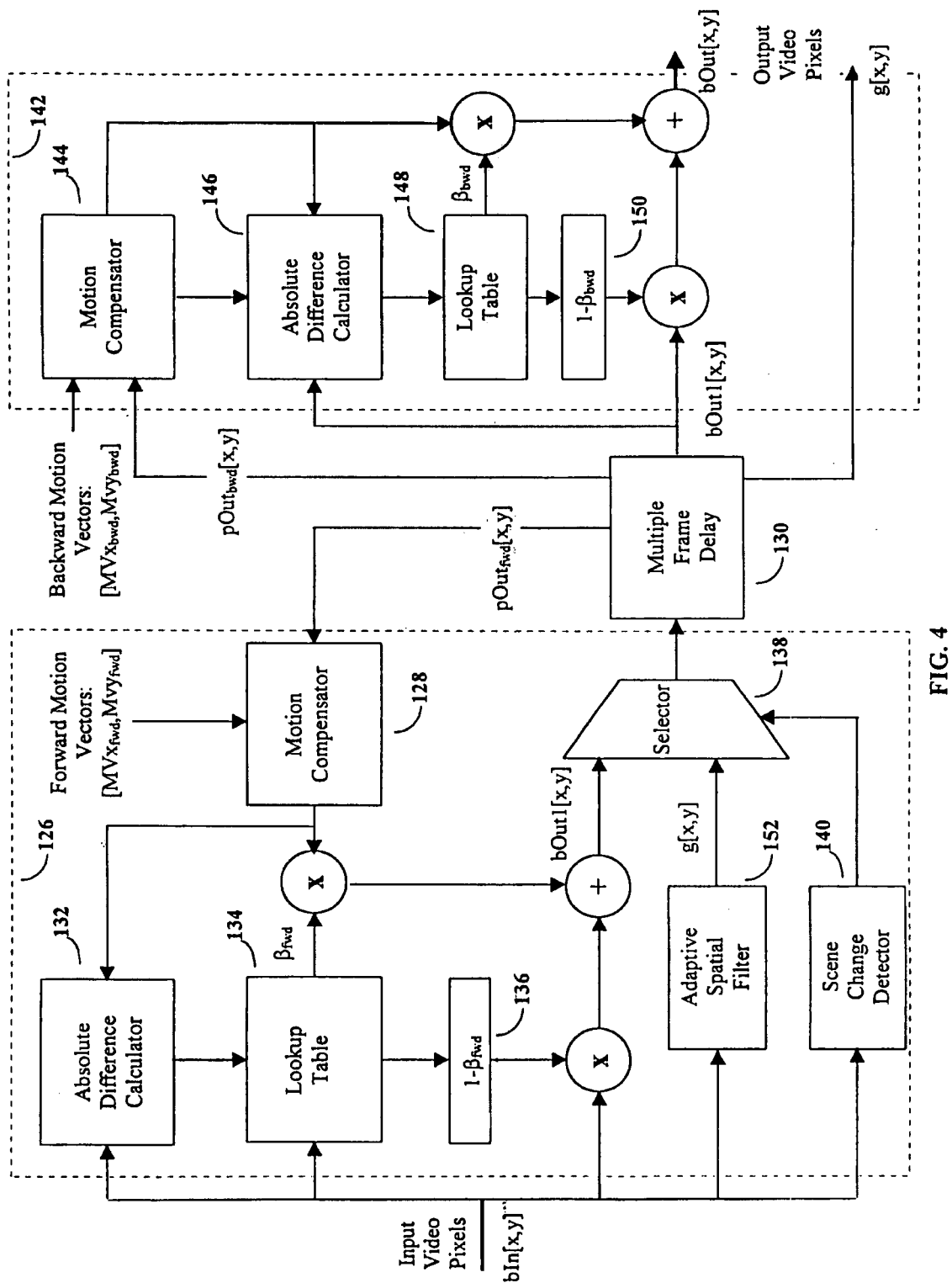
FIG. 4 illustrates the two stage adaptive filtering pipeline for B-frame pixels.

For B frames, the motion compensated temporal filter is implemented in two stages, as shown in FIG. 4. The first stage, as shown in the outlined box 126, performs forward prediction by implementing the temporal filter with the preceding P frame to generate an intermediate result for every pixel bOut1 at coordinate [x,y] using the forward motion vectors [$MVx_{fwd}$, $MVy_{fwd}$]:

$$bOut1\ [x, y] = (1-\beta_{fwd})^* bIn\ [x, y] + \beta_{fwd}^* pOut_{fwd}[x-MVx_{fwd}, y-MVy_{fwd}]$$

where:

bIn [x, y] is the input pixel at address [x,y] of the current B frame;

$pOut_{fwd}$[x, y] is the pixel value at address [x, y] of the P frame used for forward prediction. The frame is stored in the multiple frame delay 130 shown in FIG. 4, and fed to the Motion Compensator 128 as needed.

[$MVx_{fwd}$, $MVy_{fwd}$] is the forward field motion vector, rounded to an integer value, and scaled to the frame coordinate according to the field select bit in the forward motion vector.

$pOut_{fwd}$[x-$MVx_{fwd}$, y-$MVy_{fwd}$] is performed in the motion compensator section 128 by combining the Forward motion vectors with the pixel information, $pOut_{fwd}$[x,y] supplied by the multiple frame delay 130.

$\beta_{fwd}$ is a nonlinear function of the absolute difference between bIn[x, y] and $pOut_{fwd}$ [x-$MVx_{fwd}$, y-$MVy_{fwd}$]. The operation is performed by the absolute difference calculator 132 shown in FIG. 4. followed by a search for a filter function, $\beta_{fwd}$, from a lookup table 134. An example of the resulting filter function is shown in FIG. 3.

i.e. $\beta_{fwd}$=Look-up-table($|bIn[x, y]-[x-MVx_{fwd}, y-MVy_{fwd}]|$)

The product of the filter function, $\beta_{fwd}$, and the motion compensated pixel value at address [x, y] of the P frame used for forward prediction, pOutfwd [x-$MVx_{fwd}$, y-$MVy_{fwd}$], is summed with the product of the input pixels, bIn [x, y], and (1-$\beta_{fwd}$), to give an intermediate value for the pixel value, bOut1[x, y] that is sent to the selector 138 for further evaluation.

A selector 138 examines the result of a scene change detector 140. If the selector 138 receives a scene change notification, then the selector chooses the result of the adaptive spatial filter 152 to be sent to a delay stage 130 and outputs to a second pass encoder.

If the analyzed frame is not the first P-frame after a scene change in a Group of Pictures (GOP), then the intermediate result bOut1[x, y] is sent to a delay stage 130 and then on to the second stage of the temporal filter 142. The following P frame is also chosen by the selector 138 to be sent to the second stage filter where the final filtered output bOut at coordinate [x,y] is generated using the backward motion vectors [$MVx_{bwd}$, $MVy_{bwd}$]:

$$bOut\ [x, y] = (1-\beta_{bwd})^* bOut1[x,y] + \beta_{bwd}^* pOut_{bwd}[x-MVx_{bwd}, y-MVy_{bwd}]$$

where $pOut_{bwd}$[x, y] is the pixel value at address [x, y] of the P frame used for backward prediction. This frame is input to the second stage filter through the multiple frame delay 130.

[$MVx_{bwd}$, $MVy_{bwd}$] is the backward field motion vector, rounded to an integer value, and scaled to the frame coordinate according to the field select bit in the motion vector.

$pOut_{bwd}$[x-$MVx_{bwd}$, y-$MVy_{bwd}$] is determined by the motion compensator 144 by using the backward motion vectors. The result is passed to the absolute difference calculator 146 to determine $\beta_{bwd}$.

$B_{bwd}$ is a nonlinear function of the absolute difference between bOut1[x, y] and $pOut_{bwd}$[x,y], offset by the relevant motion vectors and implemented by the combination of the absolute difference calculator 146, and a lookup table 148. A characteristic curve of the non-linear function is shown in FIG. 3.

i.e. $\beta_{bwd}$=Look-up-table ($|bOut1[x, y]-Pout_{bwd}[x-MVx_{bwd}, y-MVy_{bwd}]|$)

The product of the filter function, $\beta_{bwd}$, and the motion compensated pixel value at address [x, y] of the P frame used for backward prediction, $pOut_{bwd}$ [x-$MVx_{bwd}$, y-$Mvy_{bwd}$], is summed with the product of the intermediate pixel value, bOut1[x,y], and the difference of the forward filter coefficient from unity, (1-$\beta_{fwd}$) 150, to give a resulting output for the pixel value, bOut[x, y].

If $\beta_{fwd}$ is 0, only backward motion will be used to generate the result. Similarly, if $\beta_{bwd}$ is 0, only forward motion will be used. Furthermore, different look-up-tables are established to allow the users to select the intensities of the filter. The faster β rolls off the coefficient adaptation curve, the weaker the filter is. The filter coefficient takes the values from zero to one. For the pixels with intensities close to the mean, the filter coefficient β tends toward one, and the filter becomes an average filter, which implies the strong filtering.

Adaptive Spatial Filtering

The adaptive spatial filter is defined as $$g[x,y]=(1-\alpha)^*f[x,y]+\alpha^*\mu$$

where f [x,y] and g [x, y] are respectively the input pixel value and the output pixel value at location [x, y].

μ is the local weighted mean value of a 5×5 neighborhood surrounding the pixel f[x ,y], defined as μ=(weight sum of all pixels in the 5×5 neighborhood surrounding f[x,y] excluding f[x,y])/($5^2$−1)

The following weighting table is used to calculate the weighted mean:

| 0.0125 | 0.025 | 0.05 | 0.025 | 0.0125 |
|---|---|---|---|---|
| 0.025 | 0.05 | 0.1 | 0.05 | 0.025 |
| 0.025 | 0.05 | 0.1 | 0.05 | 0.025 |
| 0.025 | 0.05 | 0.1 | 0.05 | 0.025 |
| 0.0125 | 0.025 | 0.05 | 0.025 | 0.0125 |

The weighting table is designed such that the pixels closer to the center of the 5×5 window have a higher weight. Such weighting helps to preserve texture in the image. The filter coefficient a adapts to the absolute value difference between f[x,y] and μ. Look up tables are used to select the coefficient value. An assortment of look up tables are established that allow users to select from the various intensity levels of the filter. As with the temporal filter, the faster a rolls off the coefficient adaptation curve, the weaker the filter is. The filter coefficient takes the values from zero to one. For the pixels with intensities close to the mean, the filter coefficient α tends toward one, and the filter becomes an average filter, which implies the strong filtering. For the pixels on the edges, the filter coefficient α tends toward zero, which implies that no filtering is applied.

Accordingly, it can be seen that the present invention provides an improved apparatus and method for reducing the presence of noise in a video system by applying motion compensated temporal filtering using motion vectors previously generated by a first-pass encoder. At scene change frames, adaptive spatial filtering, combined with a weighting table provides varying degrees of filtering based on pixel location relative to one another and edges. This operation preserves textures within images. As a result of the improved temporal filtering response and the reduced computational complexity; accuracy and processing throughput are enhanced.

Although the invention has been described in connection with the preferred embodiment, it should be appreciated that various modifications and adaptations may be made thereto without departing from the scope of the invention as set forth in the claims.

What is claimed is:

1. A method for reducing noise in a video distribution system comprising:
    applying motion compensated temporal filtering to compressed image data using motion vectors previously generated during compression of the image data, wherein:
        said filtering is adapted to reduce noise in said compressed image data,
        the need for regeneration of said motion vectors during said filtering step is eliminated;
        adaptive spatial filtering is applied to compressed image data; and
        a lookup table is provided for determining values for β(backward) and β(forward), corresponding to values between 0 and 1, based on a difference of pixel amplitudes.

2. A motion compensated temporal filtering method for pre-compressed video image data, comprising at least three successive video frames to reduce the presence of noise in said data, including a current frame, a first anchor frame that precedes said current frame, and a second anchor frame that follows said current frame, wherein each of said frames has a plurality of pixels, each of said pixels has an associated amplitude, and a current pixel of said current frame is intermediate and matched to a first pixel in said first anchor frame and to a second pixel in said second anchor frame, comprising the steps of:
    for P-frame and B-frame encoding,
        a forward prediction stage comprising:
            determining an absolute value difference between the amplitude of a pixel located in said current frame and the amplitude of a pixel located in said first frame, the first frame pixel location being offset from the current frame pixel location by a previously calculated motion vector;
            determining a filter coefficient, β(forward) from said absolute value difference,
            calculating a proportional value for the previous anchor frame pixel and the current frame pixel, to assign to a calculated current frame pixel value by applying an arithmetic manipulation of their respective amplitude values along with numerical values of β(forward), (1−β(forward)), and motion vectors associated therewith,
            summing the resulting proportional value of the respective anchor frame pixels with the proportional value of the current frame pixel to obtain a single calculated pixel amplitude value;
    additionally for B-frame encoding:
        a backward prediction stage comprising:
            receiving from the first forward prediction stage temporally filtered, current frame pixel amplitude values,
            determining an absolute value difference between the amplitude of a pixel located in said current frame and the amplitude of a pixel located in said second frame, the second frame pixel location being offset from the current frame pixel location by a previously calculated motion vector,
            determining a filter coefficient, β(backward), corresponding to said absolute value difference,
            calculating a proportional value for the following anchor frame pixel value and the current frame pixel value to assign to the calculated current frame pixel value, by applying an arithmetic manipulation of their respective amplitude values along with the numerical values of β(backward), (1-β(backward)), and the amplitude of said pixel located within said second frame offset by the representative motion vectors, and
            summing the resulting proportional value of the respective anchor frame pixels with the proportional value of the current frame pixel to obtain a single calculated pixel amplitude value.

3. The method of claim 1 further comprising a pipeline architecture whereby motion compensated temporal filtering is combined with spatial filtering and delay elements, to provide a look-ahead scheme for a statistical multiplexer rate control system.

4. The method of claim 1 further comprising selection of one of either transcoding or first-pass encoding for calculating said motion vectors.

5. An adaptive spatial filtering method comprising an arithmetic manipulation of input and output pixel values within a current frame, a weighted mean value for a group of pixels on said frame, and a filter coefficient, $\alpha$, wherein said weighted mean value is determined from a table comprising pixel amplitude values of a number of specified pixels within a predetermined region.

6. The method of claim 5 wherein said pixel amplitude values comprising said predetermined region are inversely proportional to the distance of the pixel from a central pixel within said region.

7. The method of claim 1 comprising a scene change detection process for determining whether said current frame qualifies as a scene change frame.

8. The method of claim 7 wherein said process selects one of either said first stage temporal filter output or said adaptive spatial filter output.

9. Apparatus for reducing noise in a video distribution system, comprising:
   a motion compensated temporal filter adapted to filter compressed image data using motion vectors previously generated during compression of the image data, wherein:
      said filtering is adapted to reduce noise in said compressed image data,
      the need for regeneration of said motion vectors during said filtering step is eliminated;
      adaptive spatial filtering is applied to the compressed image data; and
      a lookup table is provided for determining values for $\beta$(backward) and $\beta$(forward), corresponding to values between 0 and 1, based on a difference of pixel amnplitudes.

10. A motion compensated temporal filtering apparatus for pre-compressed video image data comprising at least three successive video frames to reduce the presence of noise in said data, including a current frame, a first anchor frame that precedes said current frame, and a second anchor frame that follows said current frame, wherein each of said frames has a plurality of pixels, each of said pixels has an associated amplitude, and a current pixel of said current frame is intermediate and matched to a first pixel in said first anchor frame and to a second pixel in said second anchor frame, comprising:

for P-frame and B-frame encoding:
   a first stage comprising:
      a subtracter for determining an absolute value difference between the amplitude of a pixel located in said current frame and the amplitude of a pixel located in said first frame, the first frame pixel location being offset from the current frame pixel location by a previously calculated motion vector;
      a comparator for comparing absolute value pixel differences with a table of $\beta$(forward) values stored in a tabular format,
      a calculator for determining proportional values for the previous anchor frame pixel and the current frame pixel to assign to a calculated current frame pixel value by applying an arithmetic manipulation of their respective amplitude values along with the numerical values of $\beta$(forward), $(1-\beta$(forward)$)$, and the motion vectors associated with the previous anchor frame,
      a calculator for summing the resulting proportional value of the applicable anchor frame pixels with the proportional value of the current frame pixel to obtain a single calculated pixel amplitude value; and
      a storage element for storing encoded frames whereby pixels between frames can be compared; and additionally for B-frame encoding:
   a second stage comprising:
      a subtracter for determining an absolute value difference between the amplitude of said current pixel and the amplitude of said second pixel, said second pixel location being specified by a location and an offset described by a previously calculated motion vector;
      a table of filter coefficient values, $\beta$(backward), associated with said absolute value difference,
      a calculator for determining proportional values for the second anchor frame pixel values to assign to calculated current frame pixel values by applying an arithmetic manipulation of their respective amplitude values along with the numerical values of $\beta$(backward), $1-\beta$(backward), and the motion vectors associated with the second anchor frame;
      a calculator for summing the resulting proportional value of the applicable anchor frame pixels with the proportional value of the current frame pixel to obtain a single calculated pixel amplitude value; and
      a storage element for storing encoded frames whereby pixels between frames can be compared.

* * * * *